United States Patent Office 3,793,455
Patented Feb. 19, 1974

3,793,455
TREATING HYPERTENSION WITH GERMANIUM SESQUIOXIDE DERIVATIVES
Kazuhiko Asai and Norihiro Kakimoto, Tokyo, Japan; said Kakimoto assignor to said Asai
Filed June 9, 1972, Ser. No. 261,430
Int. Cl. A61k 27/00
U.S. Cl. 424—287                     5 Claims

ABSTRACT OF THE DISCLOSURE

Hypertension is treated with organogermanium sesquioxide compounds of the formula:

$$[Ge-CH_2CHZCOY]_2O_3$$

wherein Y represents OH, ONa, OK, $ONH_4$, O-alkyl or $NH_2$, and Z represents H or $NH_2$.

BACKGROUND OF THE INVENTION

Field of the invention

This invention relates to a method for using an organogermanium sesquioxide compound for treating a mammel suffering from hypertension.

Description of the prior art

Organogermanium sesquioxide compounds such as carboxyalkylgermanium sesquioxide and derivatives thereof are well known compounds. However, the anti-hypertensive activity exhibited by the compounds of this invention affords a use previously unknown for this class of compounds.

SUMMARY OF THE INVENTION

Accordingly, it is one object of this invention to provide a new method of treatment for hypertension.
Another object of this invention is to provide a treatment for hypertension using certain organogermanium sesquioxide compounds.
These and other objects of the invention, as will become more apparent to those skilled in the art when the following disclosure is read in connection with the accompanying drawings, have been attained by administering an effective dose of an organogermanium sesquioxide compound, of the formula:

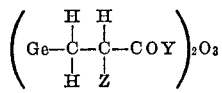

wherein Y represents OH, ONa, OK, $ONH_4$, O-alkyl or $NH_2$, and Z represents H or $NH_2$.

DETAILED DESCRIPTION OF THE PREFERRED EMBODIMENTS

Illustrative of the organogermanium sesquioxide compounds found useful in this invention are: carboxyethylgermanium sesquioxide, $(GeCH_2CH_2COOH)_2O_3$, carbamylethylgermanium sesquioxide, $$(GeCH_2CH_2CONH_2)_2O_3,$$

and aminocarboxyethylgermanium sesquioxide, $$(GeCH_2CHNH_2COOH)_2O_3.$$

These compounds are represented by the following general structural formula:

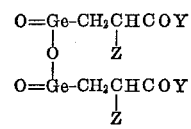

wherein Y is OH when Z is H or $NH_2$, and Y is $NH_2$ when Z is H.

Carboxyethylgermanium sesquioxide can be prepared by reacting trichlorogermane with acrylonitrile to give β-cyanoethyltrichlorogermanium which is hydrolyzed in an acidic solution to give carboxyethyltrichlorogermanium. This product is treated with thionylchloride to give trichlorogermanium propionyl chloride which is hydrolyzed with water to give the desired product.
The process is shown in the following equations:

$$GeHCl_3 + CH_2:CHCN \longrightarrow Cl_3GeCH_2CH_2CN$$

$$Cl_3GeCH_2CH_2CN \xrightarrow{hydrolysis} Cl_3GeCH_2CH_2COOH$$

$$Cl_3GeCH_2CH_2COOH + SOCl_2 \longrightarrow Cl_3GeCH_2CH_2COCl$$

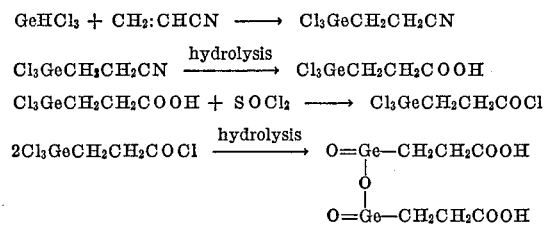

Alternatively, carboxyethylgermanium sesquioxide can be prepared by reacting trichlorogermane with acrylic acid to give carboxyethyltrichlorogermanium which is hydrolyzed to give the desired sesquioxide.
Carboxyethylgermanium sesquioxide can be easily converted to a pharmaceutically active salt or ester thereof by any conventional process.
Carbamylethylgermanium sesquioxide can be prepared by reacting trichlorogermanium propionyl chloride with ammonium hydroxide, or ammonia. α-Aminocarboxyethylgermanium sesquioxide can be prepared by reacting trichlorogermanium, α-chloropropionic acid with ammonium hydroxide or ammonia. Trichlorogermanium, α-chloropropionic acid is prepared by reacting trichlorogermane with chloroacrylic acid or by chlorinating trichlorogermanium propionic acid.

The synthetic scheme below shows the preparative routes to all three compounds:

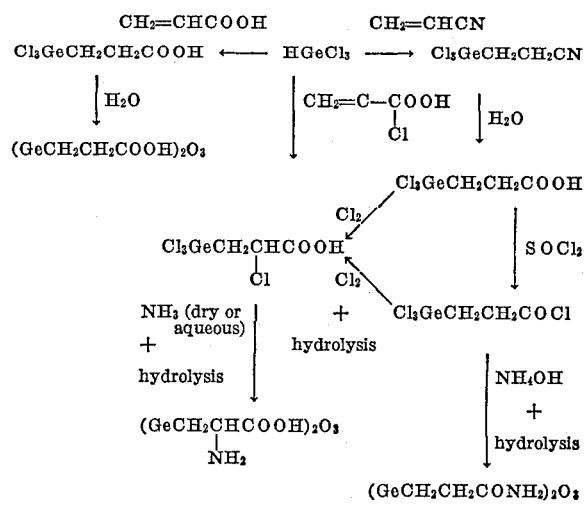

When spontaneously hypertensive rats (S.H.R.) were treated with an effective daily dose of an organogermanium sesquioxide compound, unexpected results were obtained.

For purposes of discussion, the experimental results using carboxyethylgermanium sesquioxide will be stated in detail.

Carboxyethylgermanium sesquioxide has a very low order of toxicity. The $LD_{50}$ number on mice is 6300 mg./kg. when calculated using the Litchfield-Wilcoxon method as shown below:

| Dosage (mg./kg.): | Number of deaths/total |
|---|---|
| 5000 | 0/10 |
| 5500 | 2/10 |
| 6000 | 4/10 |
| 6500 | 5/10 |
| 7000 | 7/10 |
| 7500 | 8/10 |
| 8000 | 9/10 |
| 9000 | 10/10 |

Figure 1:
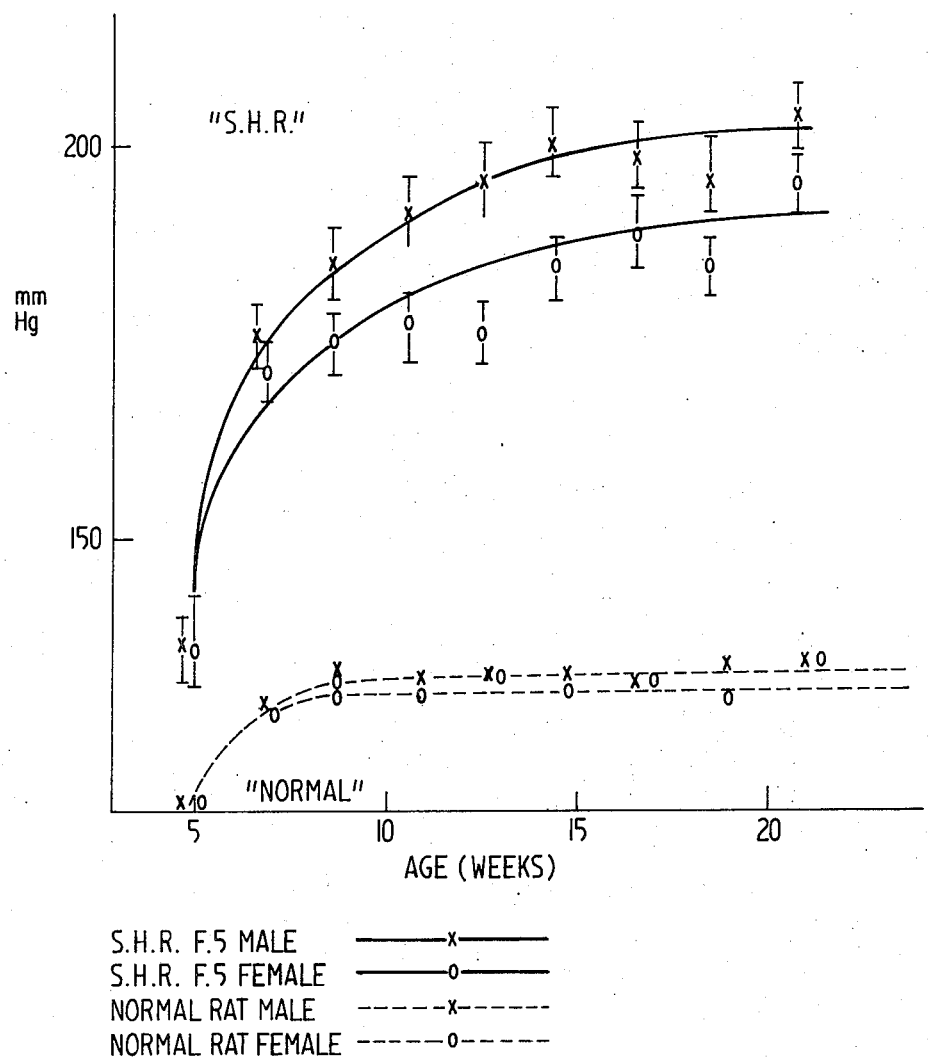
FIG. 1 is a plot of systolic blood pressure in rats versus age in weeks.

The blood pressure in spontaneously hypertensive rats (S.H.R.), (a species developed in 1962 by Okamoto and Aoki at Kyoto University of Japan) showed a gradual increase starting from about 10 weeks of age, until at 13–14 weeks of age more than 95% had reached a blood pressure level as high as 170–200 mm. Hg. A plot of systolic blood pressure versus age, as measured by a Kyoto University type Sphygmomanometer is shown in FIG. 1.

Figure 2:
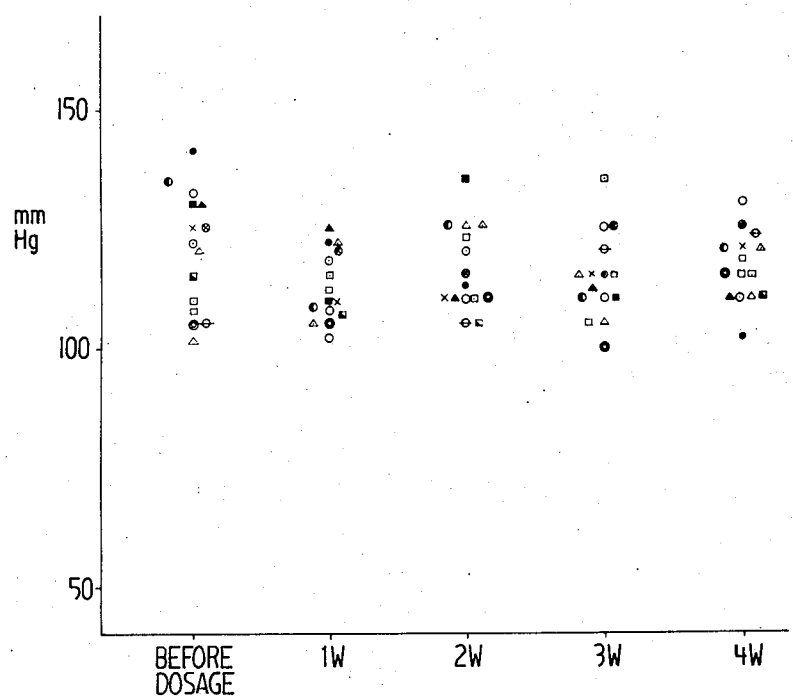
FIGS. 2 and 3 are plots of blood pressure versus time in weeks of normal male and female Wistar rats, respectively.
Figure 3:
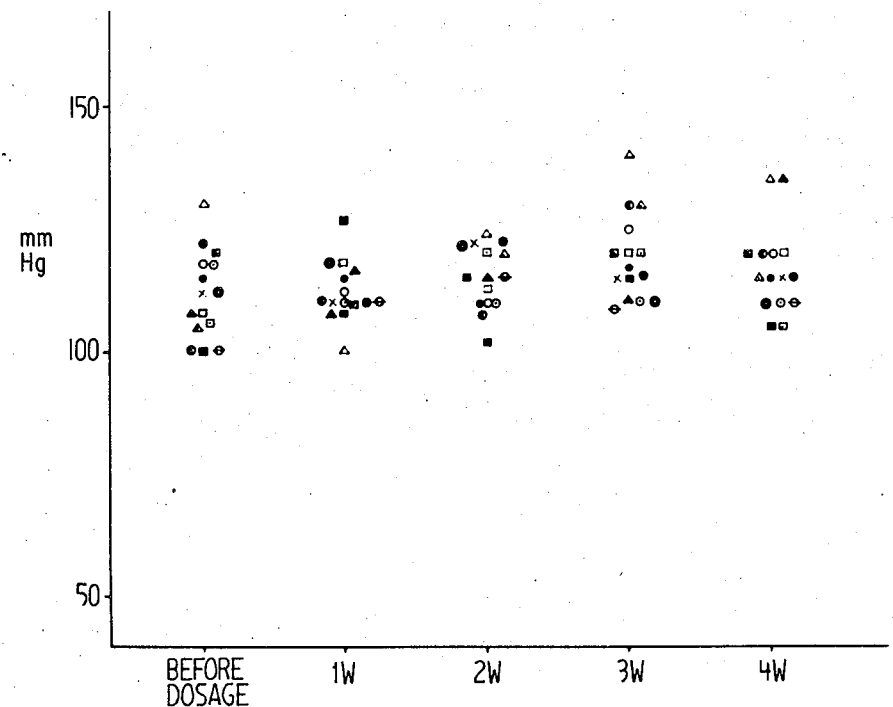
Figure 4:
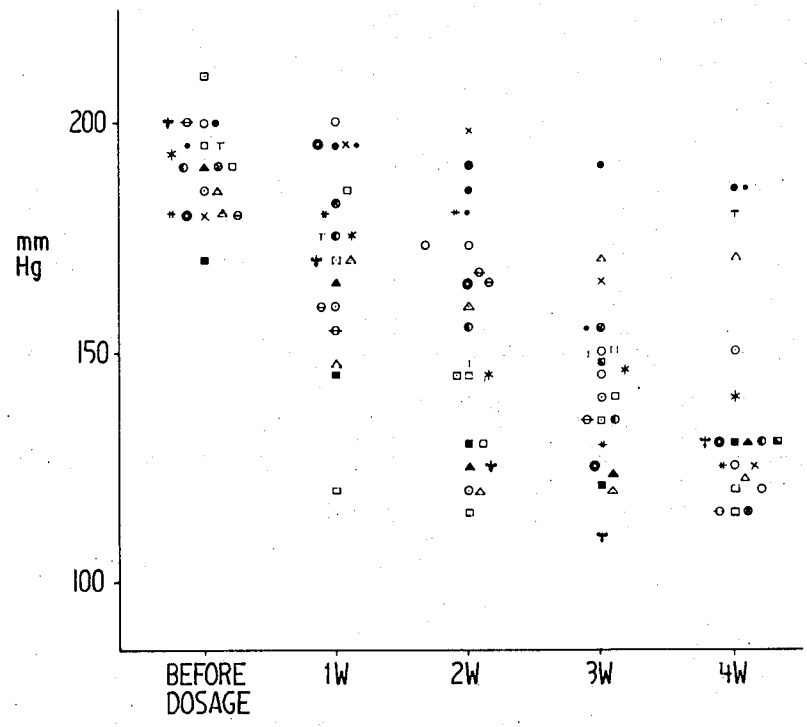
FIGS. 4 and 5 are plots of blood pressure versus time in weeks of spontaneously hypertensive rats treated with carboxyethylgermanium sesquioxide.
Figure 5:
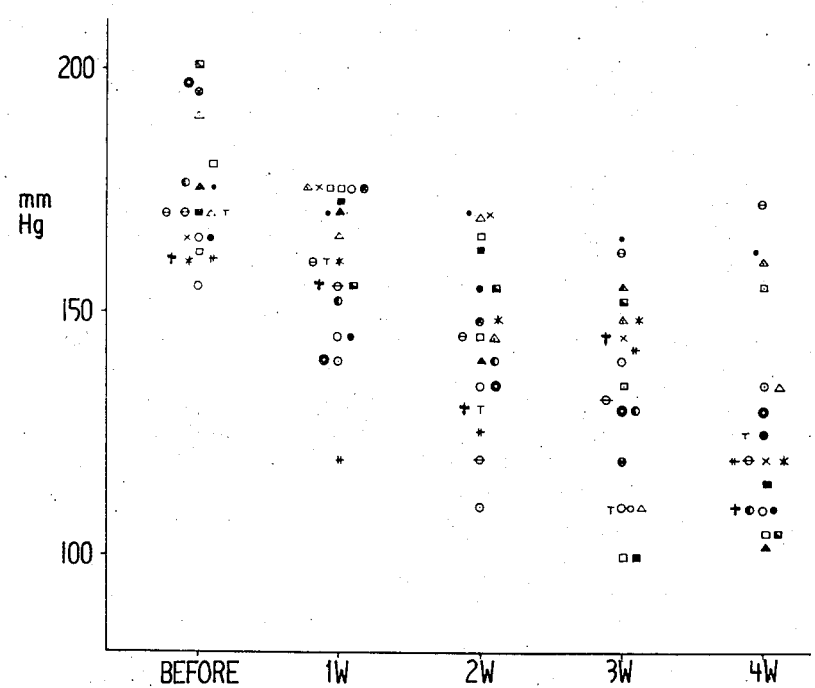
Figure 6:
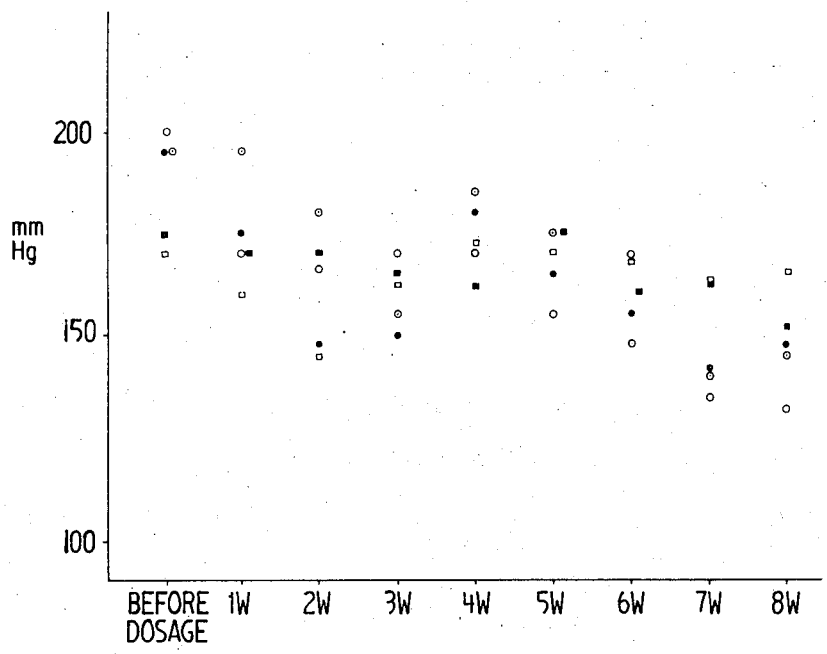
FIG. 6 is a plot of blood pressure versus time in weeks of spontaneously hypertensive rats slow to respond to treatment with carboxyethylgermanium sesquioxide.

When 30 mg./kg. of carboxyethylgermanium sesquioxide was orally administered to 15 male and female normal Wistar rats for 30 consecutive days, the blood pressure showed no particular rise or fall that could be attributed to the administration of the compound. Blood pressures ranging from 110 to 140 mm. Hg for male and female rats are shown in FIGS. 2 and 3, respectively. In other words, as far as normal Wistar rats are concerned, the compound had no effect whatsoever on their blood pressure. However, when the same quantities of the compound were orally administered daily to 20 male and 20 female 16-week-old spontaneously hypertensive rats for 30 days, the blood pressure of these animals returned to normal within as early as 7–10 days. Almost 90% of the animals indicated normal blood pressures in 20 to 30 days at the latest (males: FIG. 4, females: FIG. 5). As for the rest of the animals, it took about 60 days to lower their blood pressure to normal (FIG. 6). No significant difference was observed in the action of the compound on both sexes.

Figure 7:
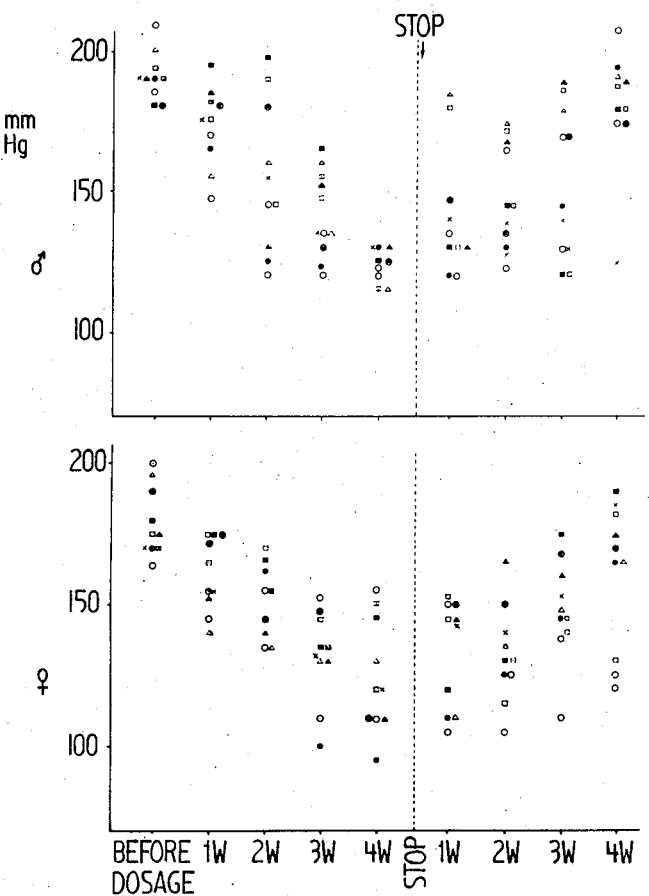
FIG. 7 is a plot of blood pressure versus time in weeks of spontaneously hpyertensive rats after treatment with carboxyethylgermanium sesquioxide was suspended.

Oral administration of the compound was discontinued after 30 days to observe its effect on blood pressure. About 10% of the animals returned to their original hypertensive state by the 7th day after discontinuation, about 10% by the 20th day and about 80% by the 30th day (FIG. 7). Thus, it can be concluded that the compound acts very slowly to lower the blood pressure of S.H.R. and has lasting effects for a considerable period of time ofter discontinuing administration of the drug.

The compound was also orally administered to 16-week-old S.H.R. in different daily doses of 0.3, 3, 30 and 300 mg./kg. for 30 days. A dose of 0.3 mg./kg. produced no discernible effect on blood pressure, while a lowering in blood pressure in some cases was discernible in about 30 days at a dosage level of 3 mg/kg. Observations at a dosage level of 30 mg./kg. have been discussed. However, a tenfold dosage increase to 300 mg./kg. was not accompanied by a proportional increase in drug effectiveness. Therefore, it is considered unlikely that large dosage levels produce particularly strong reactions. No hypotension was produced at a dosage level of 300 mg./kg.

Blood pressure in S.H.R. begins to rise from 10 to 11 weeks of age until it reaches 170 to 200 mm. Hg at approximately 14 to 15 weeks of age. When 30 mg./kg. of the compound was orally administered to S.H.R. for 6 months starting at 3 weeks of age, blood pressure continued to rise until the rate reached 14 or 15 weeks of age, thereby having little or no effect in the early weeks of drug administration. However, from 15 weeks onward, the blood pressure gradually began to fall and nearly all cases returned to normal at 17 weeks of age. Although oral administration of the compound was discontinued after 24 weeks of age, the blood pressure of almost all S.H.R. (90%) remained at a normal level for up to 100 days after suspension. No hypotension was observed in any of the rats treated with the compound. During the 6 months of oral administration of the compound, about 10% of S.H.R. showed a temporary increase in blood pressure. However, subsequent examination of these rats indicated a return to normal blood pressure levels.

Figure 8:
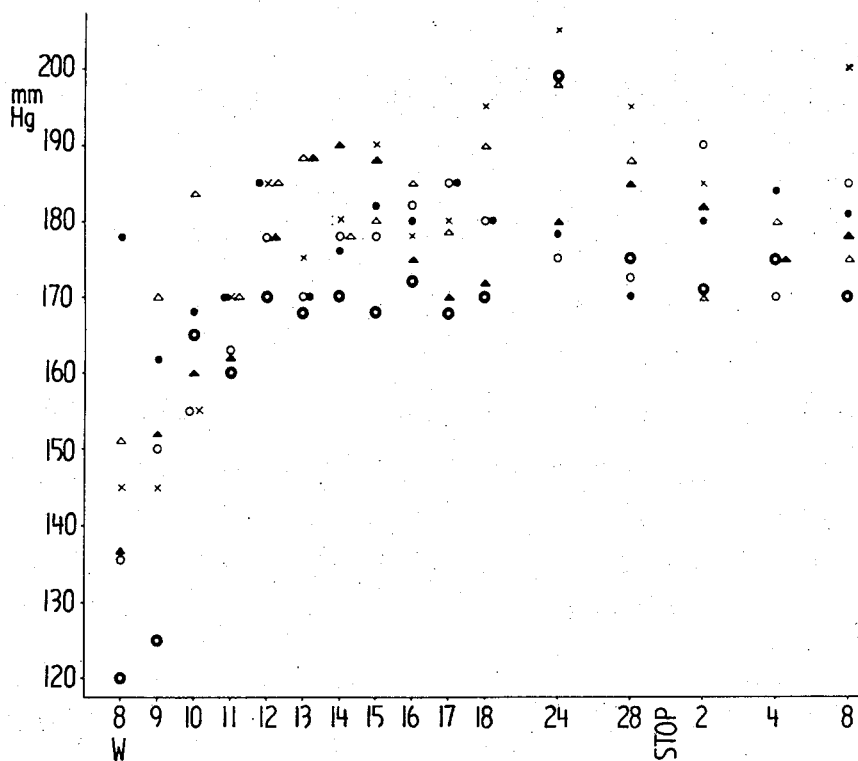
FIGS. 8 and 10 are plots of blood pressure versus time in weeks for control groups of male and female rats, respectively; and,
FIGS. 9 and 11 are plots of blood pressure versus time in weeks showing the effects of the oral administration of carboxyethylgermanium sesquioxide to groups of male and female rats, respectively.
Figure 9:
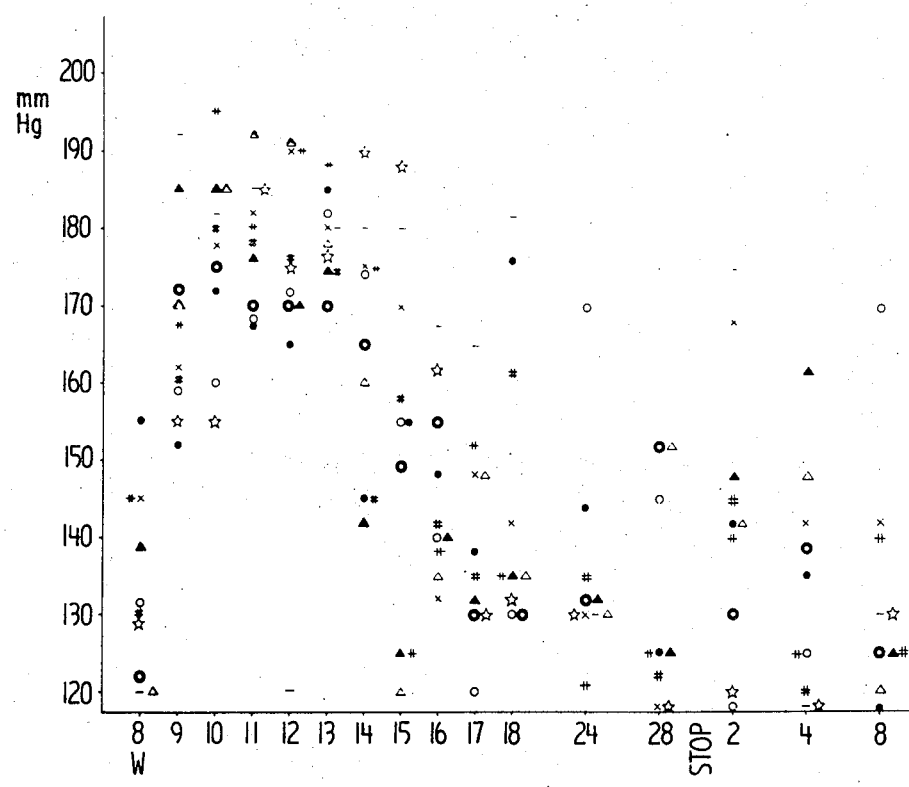
Figure 10:
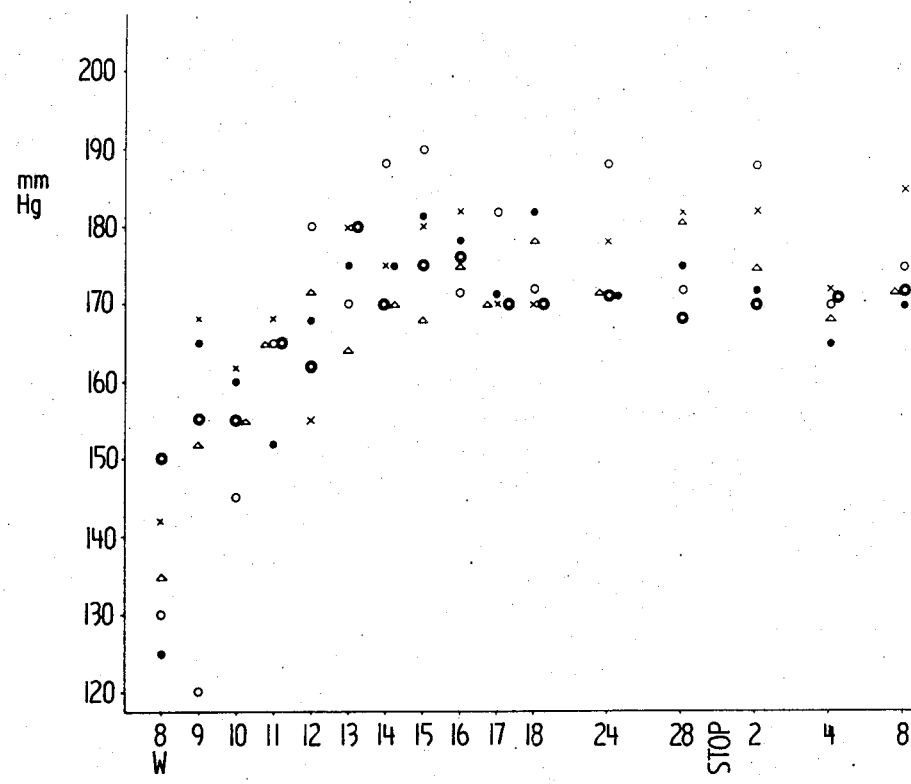
Figure 11:
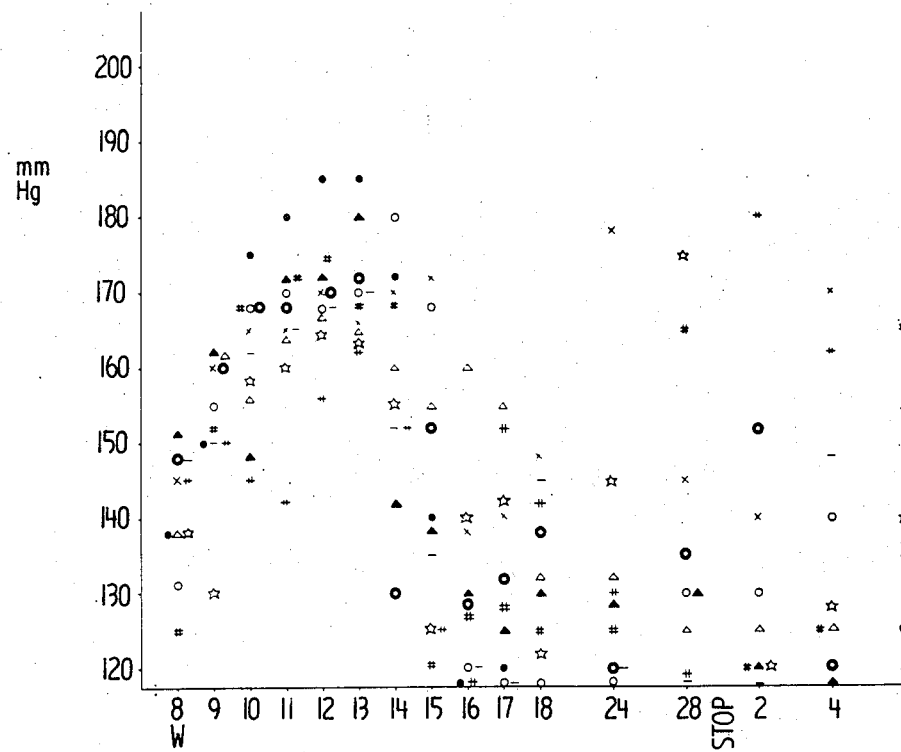

FIGS. 8 and 10 are plots for control groups of male and female rats, respectively, while FIGS. 9 and 11 are plots showing the results of the administration of carboxyethylgermanium sesquioxide to male and female rats, respectively.

The spontaneously hypertensive rats used in the experiments of this invention act as effective models for the study of hypertension in human beings. From the results obtained in these experiments, it may be concluded that the organogermanium sesquioxides of this invention offer a cure for hypertension in human beings. Tests on acute toxicity, subacute toxicity, chronic toxicity and malformation inducing action were also conducted.

It should be apparent that the pharmaceutically acceptable salts, esters, or amides of carboxyethylgermanium sesquioxide or its alpha-amino derivative thereof may also be effective for treating mammals, particularly human beings, suffering from hypertension or hypotonia.

Having now fully described the invention, it will be apparent to one of ordinary skill in the art that many changes and modifications can be made thereto without departing from the spirit or scope of the invention as set forth herein.

Accordingly, what is claimed and intended to be covered by Letters Patent is:

1. A method for treating a mammal suffering from hypertension which comprises the oral administration of an effective daily dose of an organogermanium sesquioxide compound whose formula is:

$$[GeCH_2CHZCOY]_2O_3,$$

wherein Y represents OH, ONa, OK, $ONH_4$, O-alkyl, and $NH_2$ and wherein Z represents H and $NH_2$.

2. The method of claim 1, wherein the daily dosage of a carboxyethylgermanium sesquioxide derivative is in the range from 1.5–300 mg. per kg. of body weight.

3. The method of claim 1, wherein the organogermanium sesquioxide compound is carboxyethylgermanium sesquioxide.

4. The method of claim 1, wherein the organogermanium sesquioxide compound is aminocarboxyethylgermanium sesquioxide.

5. The method of claim 1, wherein the organogermanium sesquioxide compound is carbamylethylgermanium sesquioxide.

References Cited

UNITED STATES PATENTS 3,689,516   9/1972   Asai et al. _____ 424—287

SAM ROSEN, Primary Examiner